United States Patent [19]

Kitagawa et al.

[11] 4,366,296
[45] Dec. 28, 1982

[54] UNSATURATED COPOLYMERS

[75] Inventors: Sadao Kitagawa; Isao Okada, both of Ami, Japan

[73] Assignee: Mitsubishi Petrochemical Company Limited, Japan

[21] Appl. No.: 339,462

[22] Filed: Jan. 15, 1982

Related U.S. Application Data

[63] Continuation of Ser. No. 157,054, Jun. 6, 1980, abandoned.

[30] Foreign Application Priority Data

Jun. 12, 1979 [JP] Japan .................................. 54-73808
Aug. 21, 1979 [JP] Japan ................................ 54-106494
Aug. 21, 1979 [JP] Japan ................................ 54-106495

[51] Int. Cl.³ .................... C08F 2/38; C08F 210/06; C08F 210/08; C08F 210/18
[52] U.S. Cl. ...................................... 526/77; 525/247; 525/314; 526/79; 526/336
[58] Field of Search .......................... 526/77, 79, 336; 525/247, 314

[56] References Cited

U.S. PATENT DOCUMENTS

| 2,384,975 | 9/1945 | Sparks et al. | 526/336 |
| 3,005,808 | 10/1961 | Kelley et al. | 526/77 |
| 3,681,302 | 8/1972 | Sweeney | 526/336 |
| 3,705,138 | 12/1972 | Van Den Berg | 526/336 |
| 3,880,819 | 4/1975 | Natta et al. | 526/336 |
| 3,933,769 | 1/1976 | Lal et al. | 526/336 |
| 3,991,262 | 11/1976 | Lal et al. | 526/336 |

FOREIGN PATENT DOCUMENTS 1268149 3/1972 United Kingdom .

Primary Examiner—Stanford M. Levin
Attorney, Agent, or Firm—Robert E. Burns; Emmanuel J. Lobato; Bruce L. Adams

[57] ABSTRACT

A thermoplastic, substantially resinous, unsaturated, random copolymer of ethylene, propylene or 4-methyl-1-pentene with a branched 1,4-diene of the formula

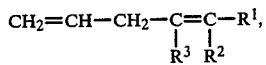

wherein $R^1$ is an alkyl group of a maximum of 8 carbon atoms, and each of $R^2$ and $R^3$ is hydrogen or an alkyl of a maximum of 8 carbon atoms, exclusive of the case where both $R^2$ and $R^3$ are both hydrogen.

14 Claims, 2 Drawing Figures

FIG. 2

UNSATURATED COPOLYMERS

This is a continuation of application Ser. No. 157,054, filed June 6, 1980, now abandoned.

BACKGROUND OF THE INVENTION

1. Technical field

The present invention relates to a resinous unsaturated copolymer prepared by the random copolymerization of ethylene, propylene, or 4-methyl-1-pentene with a particular branched 1,4-diene.

It is well known that because of its excellent properties, a polymer consisting of ethylene or propylene only or a copolymer comprising ethylene or propylene and an α-olefin has been widely used in various fields.

However, these polymers are disadvantageous in that because they are saturated hydrocarbons, they are extremely inferior with respect to adherence, paintability and printability which are principally derived from a polar group. No fundamental solution to these problems has yet been found.

2. Prior art

A large number of inventions have been made on the copolymerization of an α-olefin and a non-conjugated diene. Among these, British Pat. No. 1,268,149, U.S. Patent Nos. 3,933,769 and 3,991,262 disclose inventions which are closely related to the present invention.

British Pat. No. 1,268,149 discloses an invention in which a finely divided colloidal titanium trichloride composition is used as a transition metal component of a polymerization catalyst, and the resulting copolymer is characterized by being in the form of a colloid having an average particle size of from 0.02 to 0.5 micron. All of the examples described in this prior patent relate to ternary copolymers comprised of two types of an α-olefin, particularly, ethylene and propylene, and one type of a non-conjugated diene. This prior patent disloses no example concerning binary copolymer comprised of propylene and a branched 1,4-diene or ternary copolymers comprised of propylene and two types of a branched 1,4-diene. This prior patent aims at producing a finely divided copolymer useful for a thin layer coating, and prepares a titanium trichloride catalyst component by reducing titanium tetrachloride with an organoaluminum compound in the presence of a small quantity of an α-olefin having at least 6 carbon atoms. However, the use of such a finely divided titanium trichloride catalyst component results in extremely finely divided unsaturated copolymer particles, which gives rise to an increase in the viscosity of the content of the polymerization vessel and difficulties in removing the heat of polymerization and in recovering the resulting unsaturated copolymer. Accordingly, the invention described in this prior patent cannot be readily carried out on an industrial scale.

U.S. Pat. Nos. 3,933,769 and 3,991,262 relate to the copolymerization of an α-olefin having from 4 to 12 carbon atoms and methyl-1,4-hexadiene, the resulting copolymer being characterized, by being rubbery.

As examples of copolymers comprised of ethylene and a diene, the following copolymers are known.

(1) Copolymers comprised of ethylene and a diene having a norbornene skeleton, e.g., ethylidenenorbornene (hereinafter referred to as ENB) (e.g. German Patent Laid-open Publication No. 2,001,702).

(2) Copolymers comprised of ethylene and a chain conjugated diene, e.g., butadiene (e.g., as disclosed in Japanese Patent Publication Nos. 16783/1974, 16784/1974 and 32270/1975).

These copolymers are disadvantageous in that because the control of the molecular weight is extremely difficult, the moldability is inferior (ethylene-ENB copolymers), and the activity during the polymerization process is remarkably low. Further, the resulting copolymers possess very poor thermal resistance and weather resistance because the copolymers have a C=C bond in the main chain, or the tertiary carbon atom of the main chain is present in an allyl position (ethylene-butadiene copolymers). Accordingly, all of these copolymers are not suitable for practical use.

Considering the thermal resistance and weather resistance of the copolymer from the standpoint of molecular structure, it is preferable that the C=C bond be attached to the main chain of the copolymer as a pendent group, and, at the same time, the tertiary carbon atom of the main chain form no allyl position. As an example of a comonomer providing such a copolymer, mention may be made of 1,4-diene. However, 1,4-hexadiene, which is representative of such 1,4-dienes, not only reduces the polymerization activity of a polymerization catalyst, but, its use also results in a copolymer whose molecular weight is greatly varied when the amount of hydrogen added during the polymerization is changed by even a slight amount. Accordingly, the use of this 1,4-diene is not suitable for the industrial production of copolymers.

As a technique for producing unsaturated copolymers by copolymerizing α-olefins and polyenes in the presence of a Zeigler-Natta catalyst, there is a well known technique for industrially producing a so-called EPDM, which is an elastomer, by copolymerizing ethylene, propylene and a non-conjugated diene in the presence of a Ziegler-Natta catalyst by using a vanadium compound as a transition metal component. Various non-conjugated dienes may be used in the production of the EPDM. Examples of such non-conjugated dienes are dienes having a cyclic structure such as norbornadiene, dicyclopentadiene, propenylnorbornene, methylenenorbornene and ethylidenenorbornene and linear dienes such as 1,4-hexadiene, 1,5-octadiene, 1,6-decadiene and 1,9-octadecadiene.

A Ziegler-Natta catalyst using a vanadium compound as a transition metal component is a representative catalyst for the production of the EPDM. However, the catalyst of this type is disadvantageous in that because the resulting copolymer is easily colored even if a minor quantity of vanadium is remaining in the copolymer, a complicated process in which the remaining catalyst is thoroughly removed from the copolymer after the polymerization is completed is absolutely necessary, that the resulting copolymer does not possess high stereospecificity, and that the polymerization activity is remarkably reduced with the elapse of time.

On the other hand, when a Ziegler-Natta catalyst using a titanium compound as a transition metal component, which is a typical catalyst for the production of crystalline and resinous polyolefins and can be advantageously used on an industrial scale, is used for the copolymerization of α-olefins and the above-mentioned polyenes, other problems are encountered, although the above described disadvantages experienced in the case of the vanadium type catalyst are eliminated. That is, the control of the molecular weight of the resulting copolymer with hydrogen is greatly hindered by the action of the polyenes present, or even with a very slight change in the quantity of hydrogen added, the molecular weight of the resulting copolymer is greatly varied, which makes the molecular weight control on a practical scale remarkably difficult. Another possible result is that the polymerization activity is remarkably reduced, or the stereospecific property of the resulting copolymer is remarkably reduced.

For example, when a high stereospecific catalyst comprised of (a) a solid catalyst component having, as essential ingredients, magnesium chloride, titanium tetrachloride and ethyl benzoate, (b) triethylaluminum and (c) ethyl p-toluylate is used for the copolymerization of cis-1,4-hexadiene and propylene, only 4% by volume of cis-1,4-hexadiene, based on the concentration of the charge, which corresponds to a cis-1,4-hexadiene unit content of 1.6 mole % in the resulting copolymer, reduces the catalytic activity to one-tenth of that in the case of the polymerization of propylene only, and the boiling n-heptane insoluble matter (hereinafter referred to as I.I.) of the resulting copolymer is only 65% (Reference is made to Comparative Example C1). In the case where the copolymerization of ethylidenenorbonene and ethylene is carried out in the presence of a catalyst comprised of a solid catalyst component having, as essential ingredients, magnesium chloride, ethoxy titanium trichloride, and triethylaluminum, the control of the molecular weight of the resulting copolymer by hydrogen is completely impossible (see, Comparative Example C2), and the resulting copolymer is very difficult to shape.

It is known that the presence of hydrogen in an α-olefin polymerization system including a Ziegler-Natta catalyst reduces the molecular weight of the resulting copolymer. It appears that the behavior of hydrogen as a molecular weight controlling agent is particularly conspicuous in the production of crystalline and resinous polyolefins. It is considered that, provided that an appropriate amount of hydrogen is used, hydrogen has an influence on only the molecular weight of the resulting polymer but has no significant influence on the other properties of the polymer such as stereospecificity, the composition of comonomers in the case of copolymerization and the polymerization activity of a catalyst.

However, as stated above, hydrogen does not behave advantageously in a copolymerization system in which non-conjugated dienes co-exist over a catalyst whose transition metal component is a titanium compound, and, accordingly, a titanium type catalyst is much inferior in practical value for the above-mentioned copolymerization system.

SUMMARY OF THE INVENTION

An object of the present invention is to overcome the above described difficulties. This object can be attained by providing a random copolymer comprised of ethylene, propylene, or 4-methyl-1-pentene and a particular branched 1,4-diene.

Thus, the thermoplastic, substantially resinous, unsaturated copolymer of the present invention is a random copolymer comprised of an α-olefin selected from the group consisting of ethylene, propylene, and 4-methyl-1-pentene and a branched 1,4-diene represented by the formula (I) set forth below, said copolymer having a content of the branched 1,4-diene of from 0.01 to 30 mole % and having a melt index of not greater than 500 g/10 min.

wherein $R^1$ represents an alkyl of up to 8 carbon atoms, and each of $R^2$ and $R^3$ is a hydrogen atom or an alkyl of up to 8 carbon atoms, the case where $R^2$ and $R^3$ are both hydrogen being excluded.

In accordance with a preferred embodiment of the present invention, the copolymer is prepared by carrying out the copolymerization of the two monomers in the presence of a Ziegler-Natta catalyst whose transition metal component is a halogen-containing compound or a composition thereof.

The unsaturated copolymer of the present invention contains a pendent C=C bond derived from a particular branched 1,4-diene unit. By introducing the 1,4-diene unit itself and its pendent C=C bond, the drawbacks inherent in polyethylene or polypropylene are suppressed without a significant adverse effect on the excellent properties inherent in the polyethylene or polypropylene.

The presence of a comonomer unit and an increase in the comonomer content in ethylene copolymers and propylene copolymers ordinarily impair the excellent properties inherent in homopolyethylene or homopolypropylene. In view of this, it was quite unexpected that the ethylene and propylene copolymers of the present invention exhibit the above-mentioned effect.

As stated above, in accordance with a preferred embodiment of the present invention, the copolymer is prepared from the copolymerization in the presence of a titanium based Ziegler-Natta catalyst which is industrially advantageous and hydrogen. Under this particular copolymerization condition, hydrogen exhibits the following effects.

(i) The molecular weight of the resulting copolymer can be freely controlled with practical ease by hydrogen. In consideration of the fact that when a cyclic diene such as ethylidenenorbornene is used as a comonomer, the control of the molecular weight is almost impossible (Reference is made to Comparative Example C2 set forth hereinafter). This can be said to be unexpected.

(ii) By adding hydrogen during the polymerization, the catalytic activity is remarkably enhanced.

(iii) The reduction in the polymerization activity of the catalyst by the addition of a branched 1,4-diene of the formula (I) is small. In addition, when this particular diene is used as a comonomer, the catalytic activity is increased in comparison with the case of no addition of hydrogen, and, in some cases, the increase reaches several times the catalytic activity in the case of no addition of hydrogen.

(iv) In the case where a stereospecific copolymerization of propylene is carried out, the reduction in the so-called I.I. is small, and, thus, an increase in soluble copolymers is small.

(v) When a slurry polymerization is carried out, little reduction in the bulk density of the resulting copolymer occurs. Accordingly, the copolymerization can be carried out while maintaining the slurry at a high concentration, which results in high productivity and facilitates the handling of the resulting copolymer.

Generally, in the stereospecific copolymerization of an α-olefin, e.g., propylene, in the form of a slurry, as the content of, for example, ethylene, butene-1, hexene- 1, or 4-methyl-1-pentene is increased, the I.I. of the resulting copolymer is reduced, and the solubility of the copolymer in a solvent is increased. At the same time a reduction in the bulk density of the copolymer occurs, which results in an increase in the viscosity of the polymerization system and causes the operation of the plant to be difficult, whereby the productivity inevitably becomes low. Accordingly, it is quite surprising that when a branched 1,4-diene of the formula (I) is used as a comonomer for the stereospecific copolymerization, the increase in a polymer soluble in a solvent in the case of slurry polymerization is remarkably small, and little reduction in the bulk density of the resulting copolymer occurs. These findings can never be anticipated from the prior known facts.

DETAILED DESCRIPTION OF THE INVENTION

1. Definition of the Copolymer of the Present Invention

The unsaturated copolymer of the present invention has a structure in which ethylene units, propylene units, or 4-methyl-1-pentene units and comonomer units of formula (I') derived from a branched 1,4-diene of formula (I) are randomly arranged.

(I')

The content of the comonomer units (I') contained in the propylene or 4-methyl-1-pentene copolymer is 30 mole % or less, preferably from 0.01 to 20 mole %, more preferably from 0.05 to 10 mole %. The remainder consists essentially of propylene units or 4-methyl-1-pentene units. The content of the comonomer units (I') contained in the ethylene copolymer is 30 mole % or less, particularly from 0.01 to 20 mole %, preferably from 0.05 to 15 mole %, more preferably from 0.1 to 10 mole %. The remainder consists essentially of ethylene units.

This copolymer has a molecular weight of 500 g/10 min. or less, preferably from 0.001 to 200 g/10 min., more preferably from 0.01 to 100 g/10 min. in terms of the melt index, as measured according to the procedure of ASTM D1238.

The term "random copolymer" as used herein refers to a copolymer wherein the distribution of a branched 1,4-diene unit (I') within one copolymer molecule or between copolymer molecules is in tapered form, in addition to a copolymer wherein ethylene units, propylene units, or 4-methyl-1-pentene units and branched 1,4-diene units (I') are completely irregularly distributed.

The copolymer of the present invention is thermoplastic and substantially resinous. The term "substantially resinous" as used herein refers to a state corresponding to an initial modulus of 500 to 100,000 kg.f./cm$^2$, preferably 1,000 to 80,000 kg.f./cm$^2$, more preferably 2,500 to 50,000 kg.f./cm$^2$.

2. Branched 1,4-diene

The branched 1,4-diene to form, together with ethylene, propylene, or 4-methyl-1-pentene, a copolymer is represented by formula (I).

wherein R$^1$ represents an alkyl of up to 8 carbon atoms, preferably up to 5 carbon atoms, and each of R$^2$ and R$^3$ is hydrogen atom or an alkyl of up to 8 carbon atoms, preferably up to 5 carbon atoms, the case where R$^2$ and R$^3$ are both hydrogen being excluded.

Examples of such a branched 1,4-diene are 4-methyl-1,4-hexadiene, 5-methyl-1,4-hexadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 4-ethyl-1,4-octadiene, 5-methyl-1,4-octadiene and 4-n-propyl-1,4-decadiene. Among these, 4-methyl-1,4-hexadiene and 5-methyl-1,4-hexadiene are particularly preferable.

These branched 1,4-dienes may be used singly or in mixtures. Particularly, a mixture (in a ratio of about from 95:5 to 5:95) of 4-methyl-1,4-hexadiene and 5-methyl-1,4-hexadiene is suitable.

It is preferable that, for these branched 1,4-dienes, those which have been treated beforehand with alumina prior to polymerization be used.

Any suitable alumina can be used for this treatment, but a porous active alumina of a surface area of at least 50 m$^2$/g, particularly of the order of 100 to 500 m$^2$/g, is preferable. For the active alumina, there are those of various crystalline forms, depending on the production process thereof, such as, for example, $\chi$ form, $\gamma$ form, and $\eta$ form, but that of the $\gamma$ is preferably used because of its availability.

Among active alumina there are those that are acidic, neutral, and basic, of which neutral and basic active aluminas are particularly preferable. Depending on the treatment conditions, strongly acidic active alumina must be used with caution since the branched 1,4-diene may undergo cation polymerization or oligomerization in some cases.

An active alumina may, depending on its production process, contain a small quantity (ordinarily of the order of 5 percent or less) of impurities such as, for example, sodium oxide and iron oxide, but these are allowable provided that the branched 1,4-diene does not react therewith.

Active aluminas are sold on the market in various forms such as, for example, powder of a particle size of the order of 300 mesh and spheres and cylindrical grains of diameters of the order of 1 to 10 mm. All of these active aluminas can be used according to this invention.

There is no particular limitation of the method of alumina treatment provided that the method is consistent with the object of the treatment. Ordinarily, the selected alumina is placed in a column, and the branched 1,4-diene is passed therethrough in a stream of an inactive gas such as nitrogen gas or argon gas. As a result, the treatment can be carried with good efficiency. In this case, it will be difficult to obtain an adequate treatment effect if the ratio of the diameter to the length of the column is excessively large, and there is a tendency of the treatment effectiveness to increase with a decrease in this ratio. However, an excessively small ratio gives rise to an increase of pressure loss, and the operational efficiency of the apparatus becomes poor, but this does not necessarily mean a proportionate increase in the treatment effectiveness. Accordingly, this ratio of column diameter to the column length is ordinarily selected at a value of the order of 0.001 to 5, preferably of the order of 0.005 to 1, particularly of the order of 0.01 to 0.5.

We have found further that, if the linear velocity of the branched 1,4-diene flowing through the column is excessively high, the treatment effectiveness will be low, and that, if it is excessively low, the treatment will require a long time and will be inefficient. This flow velocity is ordinarily 0.01 to 1,000 cm/min., preferably 0.1 to 500 cm/min., particularly 0.5 to 100 cm/min. If the treatment temperature is too high, the treatment effectiveness will decrease. This treatment temperature is ordinarily $-100°$ to $100°$ C., preferably $-50°$ to $70°$ C., particularly $-30°$ to $50°$ C.

An alumina which has become saturated with impurities imparting a deleterious effect on the polymerization activity is first freed of liquid materials, then preferably washed with an alcohol, acetone, water (including steam), or the like, and then baked in a stream of air or an active gas at a temperature of the order of $100°$ to $1,000°$ C., preferably of the order of $200°$ to $900°$ C., particularly of the order of $250°$ to $800°$ C., thereby to reproduce the adsorptivity thereof.

As a result of this alumina treatment of the branched 1,4-diene, the copolymerization with the $\alpha$-olefin can be carried out with high activity and, moreover, with good reproductivity.

3. Preparation of the Copolymer of the Present Invention

The unsaturated copolymer of the present invention can be conveniently prepared by using a Ziegler-Natta catalyst for the polymerization of ethylene, or for the stereospecific polymerization of propylene or 4-methyl-1-pentene.

The catalyst is characterized by the combination of a halogen-containing titanium compound or a composition thereof as a transition metal component and a reducing component.

Representative examples of the Ziegler-Natta catalyst are a combination consisting basically of titanium trichloride or a composition thereof and an organoaluminum compound and a combination consisting basically of a supported titanium catalyst component and an organoaluminum compound.

(1) Transition metal component

Suitable examples of a titanium trichloride composition are, (a) a composition obtained by reducing titanium tetrachloride with metallic aluminum, and then, co-pulverizing the reduced titanium tetrachloride together with an electron donor such as an aromatic carboxylic acid ester and an $\alpha,\beta$-unsaturated carboxylic acid ester, (b) a composition obtained by reducing titanium tetrachloride with an organoaluminum compound, and treating the reduced product with an ether and then with titanium tetrachloride or a Lewis acid, and (c) a composition obtained by precipitating it from liquefied titanium trichloride in the presence of an ether.

As an example of a supported titanium catalyst component, mention may be made of a supported titanium component prepared from a support, particularly, a magnesium compound, and a component containing, as essential ingredients, particularly, an electron donor, and a halogen-containing titanium compound such as titanium tetrachloride, titanium tetrabromide, n-butoxytitanium trichloride, ethoxytitanium trichloride, di-n-butoxytitanium dichloride, trimethylsiloxytitanium trichloride, titanium trichloride, and titanium dichloride, preferably, titanium tetrachloride and alcoxytitanium trichlorides.

Examples of the electron donor are (i) carboxylic acid esters such as lower alkyl (approx. $C_1$–$C_6$) esters of saturated or unsaturated aliphatic carboxylic acids (approx. $C_2$–$C_{20}$, preferably $C_2$–$C_8$) or of aromatic carboxylic acids (approx. $C_7$–$C_{12}$, preferably $C_7$–$C_{10}$) such as methyl methacrylate, ethyl benzoate, ethyl toluylate and ethyl anisate, (ii) ethers such as diethyl ether, di-i-amyl ether, dibutyl ether, and tetrahydrofuran, (iii) phosphines such as triethyl phosphine and triphenyl phosphine, (iv) phosphoric amides such as hexamethyl phosphoric amide, (v) amines such as triethylamine, triphenylamine, pyridine and N,N-dimethylamine, (vi) phosphates such as triethyl phosphate and triphenyl phosphate, (vii) phosphites such as triethyl phosphite and triphenyl phosphite, (viii) amine oxides such as triethylamine oxide and triphenylamine oxide, (ix) alcohols such as $C_1$–$C_{10}$ mono- to tetrahydric alcohols, preferably $C_1$–$C_6$ monohydric alcohols, such as methanol, ethanol, propanol, butanol, hexanol, octanol, or $C_6$–$C_{10}$ phenolic compounds such as phenol, and cresol, (x) aldehydes such as formaldehyde, acetaldehyde, propionaldehyde, benazaldehyde, and methyl benzaldehyde, (xi) ketones such as acetone, methyl ethyl ketone, acetophenone and benzophenone, (xii) carboxylic acid halides such as acetyl chloride, benzoyl chloride, and toluyl chloride, (xii) amides such as acetamide, N,N-dimethyl formamide, and N,N-dimethyl benzamide. Among these, carboxylic acid esters and alcohols such as those referred to above are preferred for copolymerization of ethylene, and carboxylic acid esters, especially, aromatic carboxylic acid esters such as those referred to above are preferred for copolymerization of propylene or 4-methyl-1-pentene.

Specific examples of a preferred supported titanium catalyst component are:

(1) A catalytic solid powder obtained by copulverizing a magnesium compound such as magnesium chloride and an electron donor such as aromatic carboxylic acid esters or reacting these compounds in the presence or absence of an inert solvent, and then, co-pulverizing the resulting product together with a titanium compound or suspending the resulting product and a titanium compound in the presence or absence of an inert solvent;

(2) A solid powder obtained by reacting (a) a reaction product of a titanium compound and an electron donor with (b) a magnesium compound through the co-pulverization of these compounds;

(3) A solid powder obtained by reacting a magnesium compound, an electron donor and a titanium compound together through the simultaneous copulverization of these compounds;

(4) A product obtained by supporting titanium tetrachloride on a co-pulverized product of a solid reaction product (hereinafter referred to as a support (I)) of magnesium hydroxychloride and ethylaluminum dichloride and an aromatic carboxylic acid ester;

(5) A product obtained by co-pulverizing the support (I) and a complex of an aromatic carboxylic acid ester and titanium tetrachloride;

(6) A product obtained by treating the co-pulverized product obtained in (5) in a halogenated hydrocarbon with a halide such as halogen, interhalogen compound, sulfur monochloride, sulfur dichloride or phosphorus pentachloride;

(7) A product obtained by treating a co-pulverized product of the support (I) and an aromatic acyl halide with titanium tetrachloride and ethers or an alkoxy compound;

(8) A product obtained by treating a co-pulverized product of the support (I) and an alkoxysilane with titanium tetrachloride and phosphates or phosphites;

(9) A product obtained by subjecting a solid product (a support (II)) obtained by reacting the support (I) with a siloxane compound, instead of the support (I), to any procedure described in (4) through (8);

(10) A product obtained by using substantially anhydrous magnesium chloride (a support (III)), instead of the support (I), in any procedure described in (4) through (8);

(11) A product obtained by adding a halide such as silicon tetrachloride, aluminum trichloride, phosphorus pentachloride, antimony trichloride and tellurium tetrachloride during the co-pulverization in any procedure described in (4) through (10);

(12) A product obtained by adding a siloxyaluminum compound such as trimethylsiloxyaluminumdichloride during the co-pulverization in any procedure described in (4) through (10);

(13) A product obtained by adding a siloxane compound during the co-pulverization in any procedure described in (4) through (10);

(14) A solid obtained by reacting the reaction product of a Grignard compound and a compound containing a Si—H bond, alcohols or phenols, siloxanes, with a compound containing a Si-halogen bond, reacting the resulting solid (a support (IV)) with titanium tetrachloride, and finally reacting the resulting product with a carboxylic acid ester;

(15) A solid powder obtained by treating a reaction product of magnesium oxychloride and ethylaluminumdichloride with a polysiloxane, and reacting the resulting product with an alcohol and diethylaluminumchloride in the order described, and finally reacting the resulting product with titanium tetrachloride;

(16) A solid powder obtained by reacting magnesium chloride pulverized in a ball mill with an alkyl titanate and then reacting the resulting product with titanium tetrachloride and methyl hydrogen polysiloxane;

(17) A solid powder obtained by treating a copulverized product of magnesium chloride and ethoxytrichlorotitanium with iodine trichloride in a halogenated hydrocarbon;

(18) A solid powder obtained by using magnesium chloride in the procedure described in (15), instead of a compound obtained by treating a reaction product of magnesium oxychloride and ethylaluminum dichloride with a polysiloxane; and (19) A solid powder obtained by using a reaction product of magnesium oxychloride and ethylaluminum dichloride in the procedure described in (16), instead of magnesium chloride.

The products described in (1) through (3) and (15) through (19) are suitable for the copolymerization of ethylene, and the products described in (1) through (14), particularly, supported titanium catalyst components described in (9), (10), (11), (12) and (13) are preferable for the copolymerization of propylene or 4-methyl-1-pentene.

The above-mentioned transition metal components (both the titanium trichloride composition and the supported titanium catalyst component) ordinarily have an average particle size of from 1 to 100 microns.

(2) Reducing component

As an organometallic compound or hydride of a metal of Groups I through III in the Periodic Table which constitutes the other component of the Ziegler-Natta Catalyst, the compounds of Group III, particularly, aluminum compounds, are used. The organoaluminum compounds are represented by the formula.

$$R_n^4 AlX_{3-n}$$

wherein: $R^4$ represents a hydrocarbon residue having from about 1 to 10 carbon atoms; X represents a hydrogen atom, a halogen atom, an alkoxy group having from about 1 to 15 carbon atoms, an aryloxy group or a siloxy group; and n represents a number greater than 0 but not greater than 3 ($0 < n \leq 3$).

Examples of the organoaluminum compound are: (a) trialkylaluminums such as trimethylaluminum, triethylaluminum, triisobutylaluminum, triisoprenylaluminum and tri-n-hexylaluminum; (b) dialkylaluminum halides such as diethylaluminum chloride, diisobutylaluminum chloride and di-n-propylaluminum chloride; (c) dialkylaluminum hydrides such as diethylaluminum hydride, and diisobutylaluminum hydride; (d) alkylaluminum sesquihalides such as methylaluminum sesquichloride, ethyl-aluminum sesquichloride and n-propylaluminum sesquichloride; (e) alkylaluminum dihalides such as methylaluminum dichloride, ethylaluminum dichloride and isopropylaluminum dichloride; (f) dialkylaluminum alkoxides or aryloxides such as diethylaluminum ethoxide and diethylaluminum (2,6-di-tert-butyl) phenoxide; and (g) dialkylaluminum siloxides such as diethylaluminum trimethylsiloxide. Reaction products of these organoaluminum compounds and water or amines may be used. These organoaluminum compounds may be used singly or in mixtures. Among these, trialkylaluminum or dialkylaluminum hydride is preferred.

(3) Third catalyst component

In addition to the transition metal component and the reducing component, as a third component of the catalyst, various additives may be added to the catalyst in order to enhance, for example, the stereospecificity of the resulting copolymer. As the third component, electron donor compounds and iodine are usually used. Examples of the electron donor compounds are (a) carboxylic acid esters such as methyl methacrylate, ethyl benzoate, ethyl toluylate and ethyl anisate, (b) sulfides such as diethyl sulfide, and dibutyl sulfide, (c) ethers such as diethyl ether, dibutyl ether and tetrahydrofuran, (d) cyclic polyene compounds such as cycloheptatriene, cyclopentadiene and cyclooctatriene, (e) phosphines such as triethyl phosphine and triphenyl phosphine, (f) phosphine oxides such as triethylphosphine oxide and triphenylphosphine oxide, (g) phosphoric amides such as hexamethyl phosphoric amide, (h) amines such as triethylamine, triphenylamine, pyridine and N,N-dimethylaniline, (i) organoantimony compounds such as triethylantimony and triphenylantimony, (j) phosphates such as triethyl phosphate and triphenyl phosphate, (k) phosphites such as triethyl phosphite and triphenyl phosphite and (l) amine oxides such as triethylamine oxide and triphenylamine oxide. Among these, aromatic carboxylic acid esters such as ethyl benzoate, ethyl toluylate and ethyl anisate are particularly preferable.

(4) Polymerization conditions

The polymerization conditions may be those used for the homopolymerization of ethylene, propylene, or 4-methyl-1-pentene or the copolymerization of ethylene or propylene with another α-olefin in the presence of a Ziegler-Natta catalyst. For example, the polymerization temperature is in the range of from 0° to 200° C., preferably from room temperature to 150° C. The pressure is in the range of from atmospheric pressure to 100 kg/cm$^2$, preferably from atmospheric pressure to 50 kg/cm$^2$.

It may be surprising that the molecular weight control by hydrogen is far much easier than in the case where ethylidenenorbonene or 1,4-hexadiene is used as a comonomer (described in detail hereinafter).

In order to obtain a random copolymer, the two monomers must be present during the polymerization. However, the quantity ratio of the two monomers need not be constant throughout the polymerization. Accordingly, for example, when a copolymer wherein the distribution of the branched 1,4-diene units (I') in one copolymer molecule or between copolymer molecules is in tapered state is to be produced, the quantity ratio of ethylene, propylene, or 4-methyl-1-pentene to the branched 1,4-diene in the polymerization system may be varied with the elapse of time.

In the case where, in the random copolymerization of propylene and a branched 1,4-diene represented by formula (I), the copolymerization is carried out by causing the propylene and the branched 1,4-diene to contact from the start in the polymerization system as a polymerization method, there are instances in which, as the comonomer content in the copolymer increases, the melting point (Tm) of the copolymer becomes considerably low, the bulk density decreases or, the drop in polymerization activity with the elapse of time becomes rapid.

Accordingly, it is preferable in this invention, to first carry out a preparatory polymerization of propylene by itself under the conditions of a temperature of 0° to 100° C., preferably 5° to 70° C., a propylene pressure of atmospheric pressure to 20 kg/cm$^2$, preferably atmospheric pressure to 10 kg/cm$^2$, and a polymerization time of the order of 30 seconds to 60 minutes, preferably of the order of 1 to 30 minutes, and thereafter to introduce under pressure the branched 1,4-diene defined by formula (I) and carry out random copolymerization of propylene and the branched 1,4-diene defined by formula (I) under the conditions of a polymerization temperature of 0° to 200° C., preferably 10° to 150° C. and a pressure of the order of atmospheric pressure to 100 kg/cm$^2$, preferably of the order of atmospheric pressure to 50 kg/cm$^2$.

It is important that the proportion in the total polymer of the homopolymer of propylene formed in this preparatory polymerization be of an order such that no peak of the DSC curve based on the propylene homopolymer appears, and for this reason this proportion is ordinarily selected to be 0.005 to 10 percent by weight, preferably 0.25 to 3 percent by weight.

The polymerization method is not particularly critical. The polymerization may be carried out, for example, by a slurry method or solution method using an inert solvent, a liquid phase non-solvent polymerization method (propylene or 4-methyl-1-pentene copolymerization) wherein the polymerization is carried out in liquid 1,4-diene (I) and liquid propylene or liquid 4-methyl-1-pentene as a medium substantially without using any other liquid medium, or a gas phase method wherein the polymerization is carried out without any liquid medium while maintaining the monomers at a substantially gaseous state.

In the case where the copolymerization of the present invention is carried out by a slurry method, the following advantages can be obtained in correspondence with the use of the particular comonomer.

That is, when propylene and the branched 1,4-diene (I) are copolymerized in the slurry state in the presence of a stereospecific Ziegler-Natta catalyst, there is almost no reduction in the bulk density of the resulting copolymer, and only a small quantity of the polymer soluble in a hydrocarbon (e.g., heptane) used as a solvent is formed, whereby the properties of the polymerization slurry are excellent. Accordingly, when the slurry polymerization method is used, the reduction in productivity, which is associated with copolymerization, is small, and the production process is simple. These advantages are a great feature of the production of the copolymer of the present invention.

(5) Addition of hydrogen during the polymerization

In the case where ethylene or propylene is copolymerized with the diene of the formula (I) in the presence of a Ziegler-Natta catalyst whose transition metal component is a halogen-containing titanium compound or a composition thereof, if hydrogen co-exists in the copolymerization system, the above described effects are attained.

As stated above, when an α-olefin is copolymerized with a diene, the addition of hydrogen per se is known. The addition of hydrogen to the copolymerization system according to the present invention may be carried out by any of the conventional modes and other modes consistent with the purpose. Ordinarily, the required quantity of hydrogen may be added in a total amount at the start of the polymerization or it may be added in divided amounts over a certain period of time.

The quantity of hydrogen added greatly varies depending upon the type of the α-olefin and the branched 1,4-diene, the type of the polymerization catalyst and the polymerization conditions (temperature, pressure, and the quantity ratio of the catalyst). It is possible to set an adequate partial pressure of hydrogen suitable for the application of the resulting copolymer. Specifically, in order to obtain a stereospecific copolymer consisting essentially of propylene and 4-methyl-1,4-hexadiene and having a melt index of from 1 to 5 g/10 min., when a catalyst comprising a titanium trichloride composition and diethylaluminum chloride is used, at a temperature of 60° C. and a partial pressure of propylene of from 6 to 10 kg/cm$^2$, the partial pressure of hydrogen is in the range of from 0.1 to 1.0 kg/cm$^2$. In order to obtain a crystalline copolymer consisting essentially of ethylene and 4-methyl-1,4-hexadiene and having a melt index of from 50 to 100 g/10 min., when a catalyst comprising a supported catalyst component including a halogen-containing titanium compound using magnesium chloride or a reaction product of magnesium oxychloride and alkylaluminum dichloride as a support and trialkylaluminum is used, at a temperature of 85° C. and a partial pressure of ethylene of 4.5 kg/cm², the partial pressure of hydrogen is suitably in the range of from 2 to 10 kg/cm².

4. Features of the unsaturated copolymer of the present invention

Because the unsaturated copolymer of the present invention contains a pendent C=C bond, various modifications can be easily carried out by various reactions (e.g., addition reaction to the C=C bond, substitution reaction to the allylic position, oxidation and the like) due to the C=C bond. That is, by modification, the copolymer can be caused to undergo addition reaction, substitution reaction, oxidation, graft polymerization or cross-linking, and properties such as adhesive property, printability, and paintability can be imparted thereto. Accordingly, still unsolved problems accompanying polyethylene, polypropylene and poly-4-methyl-1-pentene can be substantially overcome. Furthermore, also in the case where a composite material is formed with an inorganic filler such as carbon black, silica, mica, talc, calcium carbonate, glass fibers, glass microspheres, carbon fibers, gypsum, clay, aluminum hydroxide, magnesium hydroxide, or titanium oxide, it can be made into a composition possessing characteristics which could not be seen in polyolefins known heretofore because of the mutual effects arising from the >C=C< bond.

The unsaturated copolymer of the present invention which has been prepared using a Ziegler - Natta catalyst including halogen-containing titanium compound is quite unique in respect of several physical properties.

First, a copolymer consisting essentially of propylene and an α-olefin ordinarily undergoes a reduction in the bulk density and the degree of crystallinity as the content of the comonomer is increased. In contrast, in the case of the unsaturated copolymer of the present invention, even if the content of the branched 1,4-diene of the formula (I) is increased, the reduction in the bulk density is remarkably small, little reduction in the degree of crystallization occurs, and up to several mole % of the branched 1,4-diene tends, rather, to increase the degree of crystallinity. These effects are quite surprising.

Secondly, the mechanical properties such as rigidity, tensile strength, elongation and impact resistance of the copolymer are not significantly inferior to those of a propylene homopolymer until the content of the branched 1,4-diene exceeds several mole %.

Accordingly, the unsaturated copolymer of the present invention may be used singly or in the form of a composition with other propylene type resins for the same applications as those of the conventional propylene type resins. It is to be understood that the unsaturated copolymer of the present invention may be used in the form of a composition with polymers other than the propylene type resins, such as ethylene type resins, poly 4-methyl-1-pentene type resins and elastomers. In addition, by carrying out modifications utilizing the pendent C=C bond, it is possible to impart adhesiveness, paintability and printability to the resulting copolymer or to produce a cross-linked polyolefin. As a result, it is possible to develop new applications which could not have been found for the conventional polyolefins.

In the case of the ethylene copolymer, the following advantages, in addition to the above-mentioned advantages arising from the pendent >C=C<, are secured. That is, when the unsaturated ethylene copolymer is mono-axially drawn at room temperature, even if the content of the branched 1,4-diene unit (I') is only about 1 mole %, the resulting product remains transparent, and it is not easily split in the longitudinal direction even at its breaking point. In contrast, when the commercially available high density polyethylene (containing about 0.5% by weight of propylene) for injection molding is mono-axially drawn, the resulting product is opaque and can be easily split in its longitudinal direction.

5. Experiments

Example A1

(1) Preparation of titanium trichloride

To a 2-liter flask containing 0.6 liter of hexane and 0.15 liter of titanium tetrachloride was added, dropwise, over 4 hours with stirring (160 rpm), a solution of 0.173 liter of diethylaluminium chloride dissolved in 0.45 liter of hexane, while the temperature within the flask was kept at 1° C. After the dropwise addition, the mixture was maintained at 1° C. with stirring for 15 minutes and then the temperature was raised slowly to 65° C. within 1 hour. This was followed by stirring for 1 hour at this temperature. The resulting solid product was separated from the liquid phase and washed 5 times with 0.5 liter of hexane.

The solid product was suspended in 1.7 liters of hexane, 0.26 liter of diisoamyl ether was added, and the suspension was stirred at 35° C. for 1 hour. The resulting reaction product was separated from the liquid phase and washed 5 times with 0.5 liter of hexane at 25° C.

The solid reaction product was suspended in 0.85 liter of a hexane solution containing 40% by volume of titanium tetrachloride, and the suspension was then stirred at 65° C. for 2 hours. The resulting solid product was separated from the liquid phase and washed 5 times with 0.5 liter of hexane to obtain a titanium trichloride composition.

(2) Preparation of the unsaturated copolymer

A 10-liter autoclave was charged with 2.5 liters of n-heptane and 2.5 liters of a mixture of 4-methyl-1,4-hexadiene and 5-methyl-1,4-hexadiene in a ratio of 8 to 2 (hereinafter the mixture being referred to as methyl-1,4-hexadienes). To the mixture were added 40 g of diethylaluminum chloride and 4.28 g of the titanium trichloride obtained above, in this order. This was followed by addition of hydrogen in an amount corresponding to 1.5 liters at standard conditions. Propylene was introduced under pressure, while the system was kept at 17° to 20° C. for 15 minutes so as to make the total pressure 1 kg/cm². The system was then subjected to polymerization for 1.5 hours by raising the temperature to 60° C. and further introducing propylene under pressure to maintain the total pressure at 6 kg/cm².

Following the polymerization, the polymerization system was supplied with 1 liter of n-butanol and subjected to an inactivation treatment of the catalyst at 60° C. for 30 minutes. It was then subjected to centrifuging to recover the resulting solid copolymer, which was dried in vacuum to obtain 2.5 kg of the copolymer. The solid copolymer showed the following properties: bulk density ... 0.52 g/ml; residues after extraction with boiling n-heptane ... 96.4% by weight; content of methyl-1,4-hexadienes determined by infrared absorption spectrography ... 3.9 mol %; and melting point (peak value) by means of DSC ... 150° C.

The properties of the copolymer are shown in detail in the following Table A1.

The filtrate of the polymerization slurry was concentrated to obtain only 16.7 g of amorphous polymeric materials.

Reference Example A1

Homopolymerization of propylene was carried out as in Example A1 except that 5 liters of n-heptane was used, and methyl-1,4-hexadiene was not used. The properties of the resulting polypropylene are also shown in Table A1.

Example A2

(1) Preparation of titanium component supported on a carrier

One hundred (100) grams of magnesium oxychloride was slurried in 1.5 liters of n-hexane, and 205 ml of ethylaluminum dichloride was added thereto. The mixture was heated and caused to react for 6 hours. The resulting solid product was separated, and 150 ml of hexamethyl disiloxane was added thereto. These materials were then heat-refluxed for 4 hours to obtain a solid carrier.

In a vibration mill were co-milled for 12 hours 20 g of the solid carrier, 9 ml of ethyl benzoate, and 3 g of trimethylsiloxyaluminum dichloride. Eight (8) grams of the resulting powder was slurried in 40 ml of 1,2-dichloroethane, and 40 ml of titanium tetrachloride was added thereto. The mixture was subjected to reaction at 80° C. for 2 hours. The resulting solid product was washed amply with hexane to obtain a titanium component supported on the carrier.

The titanium component supported on the carrier contained 2.3% by weight of titanium.

(2) Preparation of the unsaturated copolymer

A 1-liter autoclave was charged with n-heptane and methyl-1,4-hexadienes, the total volume being 0.5 liter. To the mixture were added 300 mg of triethylaluminum, ethyl p-toluylate in an amount corresponding to 0.26 mol per mol of triethylaluminum and 61 mg of the titanium component supported on the carrier obtained above, in this order. This was followed by addition of hydrogen in an amount corresponding to 100 ml at standard conditions. Propylene was introduced under pressure, and the total pressure was maintained at 1 kg/cm². The system was caused to react at 15° to 20° C. for 15 minutes and then caused to undergo polymerization for 1.5 hours by raising the temperature to 60° C. and further introducing propylene under pressure to maintain the total pressure at 7 kg/cm².

The properties of the resulting polymers are shown in Table A2.

TABLE A1

| | Experiments | |
|---|---|---|
| | Example A1 | Reference Example A1 |
| Content of methyl-1,4-hexadienes (mol %) | 3.9 | 0 |
| Bulk density (g/ml) | 0.52 | 0.52 |
| Residue after extraction with boiling n-heptane (%) | 96.4 | 97.8 |
| Melting point (DSC peak value) (°C.) | 150 | 165 |
| Melt index (g/10 min.) | 3.8 | 4.4 |
| Density (g/ml) | 0.9014 | 0.9063 |
| Haze (%) | 50.7 | 55.3 |
| Tensile-strength yield point stress (kg/cm²) | 320 | 350 |

TABLE A1-continued

| | Experiments | |
|---|---|---|
| | Example A1 | Reference Example A1 |
| & elongation breaking point stress (kg/cm²) | 470 | 340 |
| elongation at break (%) | 740 | 690 |
| Flexural rigidity (kg/cm²) | 10,100 | 9,200 |
| Charpy impact strength (kg/cm²) 23° C. | 3.3 | 2.8 |
| −20° C. | 2.3 | 1.9 |
| Torsional rigidity (kg/cm²) 23° C. | 3,010 | — |
| −23° C. | 7,950 | — |

TABLE A2

| Particulars | Concentration of charged methyl-1,4-hexadienes (% by volume) | | | |
|---|---|---|---|---|
| | 0 | 10 | 20 | 50 |
| Content of methyl-1,4-hexadienes (mol %) | 0 | 1.1 | 2.1 | 4.0 |
| Melting point (DSC peak value) (°C.) | 161 | 154 | 150 | 146 |
| Residue after extraction with boiling n-heptane (%) | 93.6 | 93.0 | 92.8 | 91.1 |
| Bulk density (g/ml) | 0.34 | 0.34 | 0.34 | 0.33 |
| Density (g/ml) | 0.9015 | 0.8993 | 0.8990 | 0.8977 |
| Melt index (g/10 min.) | 0.73 | 1.3 | 1.4 | 0.9 |
| Yield point stress (kg/cm²) | 300 | 280 | 260 | 240 |
| Tensile modulus of elasticity (kg/cm²) | 4,900 | 4,850 | 4,600 | 3,300 |
| Degree of crystallization (powder, x-rays) (%) | 44 | — | 45 | 47 |

Example A3

A 1-liter autoclave was charged with 0.25 liter of n-heptane and 0.25 liter of methyl-1,4-hexadienes. To these were added 6.0 g of diethylaluminum chloride and 0.60 g of the titanium trichloride composition prepared in Example A1, in this order, after which hydrogen was added in an amount corresponding to 0.07 liter at standard conditions. Propylene was introduced into the autoclave under pressure, while the system was kept at 17° to 20° C. for 15 minutes so as to make the total pressure 1 kg/cm². The system was then caused to undergo polymerization for 3 hours by raising the temperature to 60° C. and further introducing propylene under pressure to maintain the total pressure at 4 kg/cm².

After the polymerization, the reaction mixture was treated by a conventional method to obtain 186 g of the resulting copolymer. The copolymer exhibited the following properties: bulk density . . . 0.50 g/l; melt index . . . 0.2 g/10 min.; melting point . . . 150° C.; content of methyl-1,4-hexadienes . . . 8.4 mol %; and residue after extraction with boiling heptane . . . 87.9% by weight. From the filtrate was recovered 5.0 g of amorphous polymeric material.

Examples B1 through B3

(1) Preparation of a supported catalyst

One hundred (100) grams of magnesium oxychloride was slurried in 1.5 liters of n-hexane, and 205 ml of ethylaluminum dichloride was added thereto. The mixture was heat-refluxed for 4 hours. The resulting solid product was separated from the liquid phase and washed 5 times with 100 ml of n-hexane to obtain a solid carrier.

Ten (10) grams of the solid carrier was slurried in 300 ml of n-heptane. To the slurry was added dropwise 27 g of ethanol over 45 minutes. The resulting slurry was stirred at room temperature for 1.5 hours. Then, 36 g of diethylaluminum chloride was added dropwise thereto at room temperature over one hour. This was followed by stirring for 1.5 hours. To the reaction system was added 50 ml of titanium tetrachloride, and the system was caused to react at 95° C. for 2 hours. The resulting solid product was separated from the liquid phase and washed 5 times with 100 ml of n-hexane to obtain a supported catalyst, which contained 8.8% by weight of titanium.

(2) Preparation of the unsaturated copolymer

A 1-liter autoclave was charged with methyl-1,4-hexadienes and n-heptane, the total volume being 0.5 liter. To the mixture were added 100 mg of triethylaluminium and the supported catalyst obtained above in an amount corresponding to 0.5 mg of titanium atoms. Copolymerization was carried out at 85° C. for 1.5 hours by maintaining a hydrogen partial pressure at 1 kg/cm² and an ethylene partial pressure at 4.5 kg/cm². The results are shown in Table B1.

Reference Example B1

Copolymerization of ethylene and ENB (5-ethylidene-2-norbornene) was carried out as in Example B1 except that 0.1 liter of ENB was used instead of the methyl-1,4-hexadienes, and the partial pressures of hydrogen and ethylene were maintained at 18 kg/cm² and 4.5 kg/cm², respectively. The results are shown in Table B1.

Reference Example B2

Copolymerization of ethylene and 1,4-hexadiene was carried out as in Example B1 except that 0.05 liter of 1,4-hexadiene was used instead of the methyl-1,4-hexadienes. The results are shown in Table B1.

determination of the melt index in spite of the hydrogen concentration being as high as 80% in the gaseous polymerization phase (cf. Reference Example B1). On the other hand, when a 1,4-hexadiene is used as the comonomer, the polymerization activity is also lowered (½ or lower as compared with methyl-1,4-hexadienes) and the melt viscosity is too low for determination of the melt index (cf. Reference Example B2).

As described above, the use of a conventional diene compound as a comonomer not only lowers the polymerization activity markedly, but also makes it very difficult to control the molecular weight of the resulting copolymer. In contrast, when a branched 1,4-diene is used as a comonomer in the present invention, there is afforded a great advantage in that the polymerization activity is not lowered very much, and the molecular weight of the resulting copolymer is readily controlled, in the same degree as in the homopolymerization of ethylene, by the addition of hydrogen upon the copolymerization.

Examples B4 and B5

(1) Preparation of supported catalyst

Commercially-available anhydrous magnesium chloride was ball-milled for 24 hours, and 10 g of the resulting powder was slurried in 150 ml of n-hexane. 10 g of n-butyl titanate was then added to the slurry, which was stirred at 70° C. for 1 hour. To the slurry were added 2.2 ml of titanium tetrachloride and 7.2 g of methylhydrogen polysiloxane having a viscosity of 21 centistokes, the mixture then being stirred for 2 hours. After the stirring, the resulting solid component was used as a catalyst component without further washing. The resulting supported catalyst contained 7.1% by weight of titanium.

(2) Preparation of the unsaturated copolymers

Copolymerization of ethylene and methyl-1,4-hexadienes was carried out by using the supported catalyst

TABLE B1

| Experiments | methyl-1,4-hexadienes (liter) | yield of copolymer (g) | polymerization activity (g-polymer/g-supported catalyst) | content of methyl-1,4-hexadienes in copolymer (mol %) | B.D.*¹ (g/ml) | M.I.*² (g/10 min.) | Tm*³ (°C.) | S.G.*⁴ (g/ml) |
|---|---|---|---|---|---|---|---|---|
| Example B1 | 0.05 | 187 | 32,800 | 1.3 | 0.35 | 2.2 | 127 | 0.935 |
| Example B2 | 0.10 | 175 | 30,700 | 2.0 | 0.34 | 2.1 | 124 | 0.928 |
| Example B3 | 0.25 | 128 | 21,100 | 3.8 | 0.31 | 2.3 | 120 | 0.920 |
| Reference Example B1 | 0.1 (ENB) | 95 | 16,700 | 1.7 (ENB) | 0.26 | no flow | 126 | — |
| Reference Example B2 | 0.05 (1,4-hexadiene) | 69 | 12,100 | 1.4 (1,4-hexadiene) | 0.29 | excessive flow | 125 | 0.939 |
| Example B4 | 0.05 | 181 | 25,900 | 1.2 | 0.33 | 0.66 | 125 | 0.936 |
| Example B5 | 0.25 | 113 | 16,100 | 3.7 | 0.30 | 0.57 | 120 | 0.920 |

Note:
*¹bulk density
*²melt index
*³melting point (DSC peak value)
*⁴true density By comparing the results of Examples B1, B2, and B3 with those of Reference Examples B1 and B2, the following facts will be readily appreciated, which will clarify the superiority of the present invention over the prior art.

The cases of similar contents of comonomers in the resulting copolymers will be compared. When ENB is used as the comonomer, the polymerization activity in the polymerization system is only half the activity when methyl-1,4-hexadienes are used. Moreover, the melt viscosity of the resulting copolymer is too high for prepared above as in Example B1 except that a hydrogen partial pressure of 0.5 kg/cm² was used. The results are shown in Table B1.

(3) Tensile test of the unsaturated copolymers

The copolymers obtained in Examples B4 and B5 were molded into pressed sheets of 2-mm thickness, respectively. Dumbell-shaped test pieces having a parallel-part length of 30 mm and a width of the parallel part of 10 mm were cut from the pressed sheet. These test specimens were subjected to a tensile test at 25° C.

and at a tension application rate of 50 mm/min. The results are shown in Table B2.

These specimens became transparent as soon as they were elongated by tension loading and were still transparent when they reached the breaking point.

TABLE B2

| | Specimens | |
|---|---|---|
| | Example B4 | Example B5 |
| Yield point stress (kg/cm$^2$) | 169 | 88 |
| Breaking elongation (%) | 780 | 590 |
| point stress (kg/cm$^2$) | 286 | 141 |
| Tensile modulus of elasticity (kg/cm$^2$) | 3,170 | 1,100 |

Examples C1, C2, and C3, Reference Examples C1 and C2, and Comparative Examples C1 and C2

(1) Preparation of solid catalyst components

The methods used in the Examples and Comparative Examples for preparation of halogen-containing titanium compounds or compositions thereof (hereinafter referred to as solid catalyst components) are described below.

Solid catalyst component A

A pot (of stainless steel, 1.2 liter in capacity, containing 1.1 liters in bulk volume of stainless steel balls 12.7 mm in diameter) for a vibration mill was charged with 20 g of magnesium chloride and 3 g of trimethylsiloxyaluminum dichloride, which were co-milled for 12 hours under the conditions of a vibrational amplitude of 3.5 mm, a frequency of 24.2 Hz, and an acceleration of 8.3 G. The mixture was then co-milled for 2 hours after addition of 5.3 ml of ethyl benzoate and further co-milled for 2 hours after addition of 5.3 ml of ethyl benzoate. Finally, the mixture was further co-milled after addition of 7.4 ml of titanium tetrachloride. Eight (8) grams of the co-milled product was taken in a 3-necked flask and slurried in a mixed solvent consisting of 75 ml of 1,2-dichloroethane and 25 ml of hexane. Then 0.2 g of iodine trichloride was added to this slurry. The mixture was caused to react at 75° C. for 2 hours. The resulting solid product was separated and washed 7 times with 5 ml of hexane to obtain a solid catalyst component A, which contained 1.94% by weight of titanium.

Solid catalyst component B

Into a 2-liter flask containing 0.6 liter of hexane and 0.15 liter of titanium tetrachloride under stirring (160 rpm) was added dropwise over 4 hours a solution of 0.173 liter of diethylaluminum chloride dissolved in 0.45 liter of hexane, while the temperature within the flask was maintained at 1° C. After this dropwise addition, the mixture was maintained at 1° C. with stirring for 15 minutes, and then heated to a temperature of 65° C. within 1 hour, which was followed by stirring for 1 hour at this temperature. The resulting solid product was separated from the liquid phase and washed 5 times with 0.5 liter of hexane.

The solid was suspended in 1.7 liter of hexane, 0.26 liter of di-isoamyl ether was added to this suspension, which was then stirred at 35° C. for 1 hour. A solid reaction product was separated from the liquid phase and washed 5 times with 0.5 liter of hexane at 25° C.

The solid reaction product was the suspended in 0.85 liter of a hexane solution containing 40% by volume of titanium tetrachloride, and the suspension was stirred at 65° C. for 2 hours. The resulting solid product was separated from the liquid phase and washed 5 times with 0.5 liter of hexane to obtain the solid catalyst component B.

The solid catalyst component B was a composition containing a major part of δ-type porous titanium trichloride.

Solid catalyst component C

The vibration mill used in the preparation of the solid catalyst component A was charged with 20 g of magnesium chloride and 14 g of ethoxytrichlorotitanium, which were co-milled for 24 hours. Three (3) grams of the co-milled powder was slurried in 70 ml of 1,2-dichloroethane, and 0.1 g of iodine trichloride was added thereto. This slurry was stirred at 80° C. for 2 hours. The resulting solid product was separated from the liquid phase and washed sufficiently with hexane to obtain the solid catalyst component C, which contained 9.1% by weight of titanium.

(2) Copolymerization

Example C1

A 1-liter stainless steel autoclave with an electric-induction stirrer was fully dried and then purged with dry propylene. The autoclave was charged with 0.4 liter of well-dried n-heptane and 0.1 liter (20% by volume) of methyl-1,4-hexadienes under a stream of propylene gas. The autoclave was further charged at room temperature with 300 mg of triethylaluminum (hereinafter referred to as TEA), ethyl p-toluylate in a quantity corresponding to 0.26 mol per mol of TEA, and 72.2 mg of the solid catalyst component A obtained above, in this order. Then a predetermined amount of hydrogen gas was added. Copolymerization was carried out at 60° C. for 1.5 hours by adding propylene gas under pressure and maintaining the total pressure therein at 7 kg/cm$^2$G. After the polymerization, the remaining gases were purged, and the resulting solid copolymer was separated by filtration and then dried.

According to conventional methods, the I.I., bulk density (B.D.), melt index (M.I.) and melting point (Tm) of the copolymer were determined. The copolymer was molded into a pressed sheet of 0.5-mm thickness, and its content of methyl-1,4-hexadienes was determined by infrared absorption spectrography. The filtrate by the above-mentioned filtration was concentrated to recover a soluble copolymer dissolved in the liquid medium. The results are shown in Table C1.

Reference Example C1

Homopolymerization of propylene was carried out in the co-presence of hydrogen as in Example C1, except that use was made of 36.1 mg of the solid catalyst component A, 150 mg of TEA, and 0.5 liter of n-heptane instead of methyl-1,4-hexadienes. The results are shown in Table C1.

Comparative Example C1

Copolymerization of propylene and cis-1,4-hexadiene was carried out as in Example C1 except that 0.02 liter of 1,4-hexadiene instead of methyl-1,4-hexadienes and 0.48 liter of n-heptane as a solvent were used. The results are shown in Table C1.

TABLE C1

| Experiments | Quantity of hydrogen (ml) | Yield of solid polymer (g) | Yield of soluble polymer (g)[*1] | Polymerization activity (g-polymer/g-solid catalyst) | Specific activity[*2] | I.I. (%) | B.D. (g/ml) | M.I. (g/10 min) | Tm[*3] (°C.) | Content of comonomer (mol %) |
|---|---|---|---|---|---|---|---|---|---|---|
| Example C1 | 0 | 40 | 0.7 (1.7) | 560 | 1.0 | 92.2 | 0.34 | 0.20 | 150 | 2.0 |
|  | 50 | 109 | 2.6 (2.3) | 1,540 | 2.8 | 91.8 | 0.34 | 1.4 | 150 | 2.0 |
|  | 100 | 149 | 3.3 (2.2) | 2,110 | 3.8 | 92.0 | 0.34 | 2.6 | 151 | 2.0 |
|  | 200 | 181 | 4.9 (2.6) | 2,580 | 4.6 | 91.0 | 0.35 | 5.0 | 151 | 2.0 |
| Ref. Example C1 | 0 | 250 | 3.8 (1.5) | 6,950 | 1.0 | 95.3 | 0.33 | 0.20 | 160 | — |
|  | 50 | 252 | 4.9 (1.9) | 7,000 | 1.0 | 95.5 | 0.33 | 0.33 | 160 | — |
|  | 100 | 248 | 4.3 (1.7) | 6,960 | 1.0 | 93.6 | 0.34 | 0.73 | 161 | — |
| Comparative Example C1 | 100 | 50 | 3.5 (6.6) | 730 | — | 64.9 | 0.19 | 61 | 148 | 1.6 |

Note:
[*1] The data in the parenthesis show the ratio (weight %) of the soluble polymer to the total polymers produced.
[*2] The relative activity when hydrogen was added, while the polymerization activity was set at 1 when no hydrogen was added.
[*3] The DSC peak value From a comparison of Example C1 with Reference Example C1 and Comparative Example C1, the following will be readily appreciated. First, the molecular weight (which is correlative to M.I.) is readily controlled when the methyl-1,4-hexadiene is used as a comonomer according to the present invention. When cis-1,4-hexadiene is used as a comonomer, however, even a small fluctuation in the quantity of hydrogen changes the M.I. of the resulting copolymer, and control of the molecular weight is very difficult. Secondly, when the methyl-1,4-hexadiene is used as a comonomer, the polymerization activity is markedly enhanced as the amount of hydrogen is increased. This is a characteristic phenomenon, which cannot be observed in the homopolymerization of propylene. Thirdly, in the copolymerization of the methyl-1,4-hexadiene and propylene, the I.I. and B.D. of the resulting copolymer are not substantially lowered. This is in a contrast to the fact that they are markedly lowered when cis-1,4-hexadiene is used. Fourthly, the activity of copolymerization of propylene with the methyl-1,4-hexadiene is much greater in the co-presence of hydrogen than that with 1,4-hexadiene.

Figure 1:
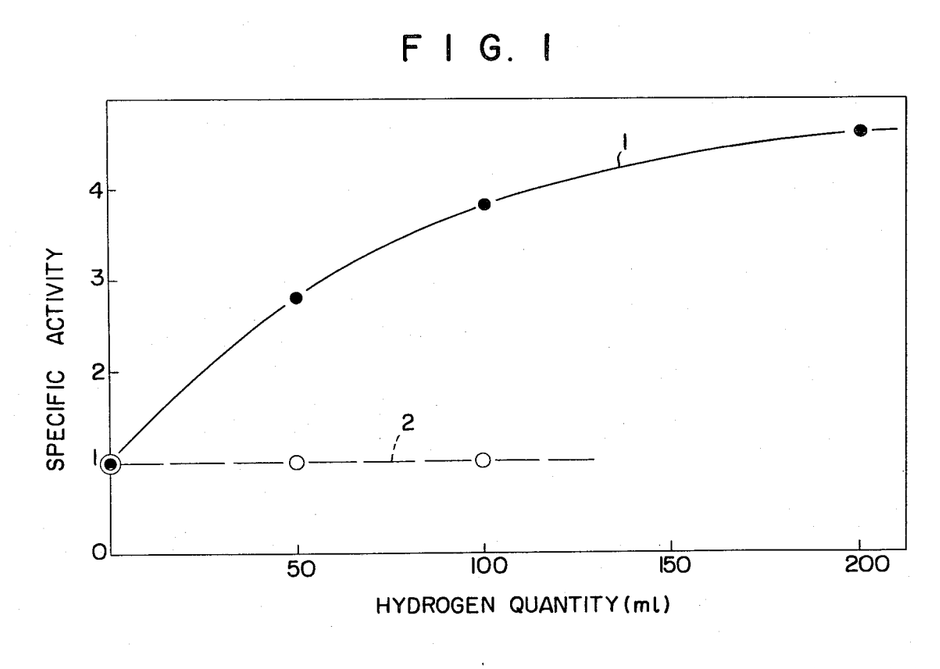
FIG. 1 is a graph indicating certain results of Example C1 (curve 1) and Reference Example C1 (curve 2)

FIG. 1 of the accompanying drawing illustrates the relation between the quantity of hydrogen added and the specific activity with respect to Example C1 and Reference Example C1, which is further explained below.

Example C2

In this example, 0.4 liter of n-heptane and 0.1 liter of methyl-1,4-hexadienes were used. As the catalyst, 160 mg of the solid catalyst component B obtained above and 1,600 mg of diethylaluminum chloride were employed. Copolymerization with propylene was carried out in the presence of 150 ml of hydrogen under the conditions of kg/cm²G (total pressure), 60° C., and 2.5 hours. The results are shown below.

| | |
|---|---|
| Polymerization activity | 1,130 (g-polymer/g-solid catalyst) |
| I.I. | 97.5 (%) |
| B.D. | 0.48 (g/ml) |
| M.I. | 1.1 (g/10 min.) |
| Tm | 154 (°C.) |
| Content of comonomer | 1.8 (mol %) |

Example C3

In this example, 0.4 liter of n-heptane as a solvent, 0.1 liter of methyl-1,4-hexadienes as a comonomer, and 10 mg of the above-described solid catalyst component C and 200 mg of TEA as a catalyst were used. Copolymerization of ethylene and methyl-1,4-hexadienes was carried out in the same apparatus as in Example C1 at 85° C. for 1.5 hours by maintaining the partial pressure of ethylene at 4.5 kg/cm²G and employing various partial pressures of hydrogen. The results are shown in Table C2.

Reference Example C2

Homopolymerization of ethylene was carried out under various partial pressures of hydrogen as in Example C3, except that methyl-1,4-hexadienes were not used, and 0.5 liter of n-heptane, 5.0 mg of the solid catalyst component C and 100 mg of TEA were used. The results are shown in Table C2.

TABLE C2

| Experiments | partial pressure of hydrogen (kg/cm²G) | yield of (co)polymer (g) | polymerization activity (g-polymer/g-solid catalyst) | specific[*1] activity | B.D. (g/ml) | S.G.[*2] (g/ml) | M.I. (g/10 min) | Tm[*3] (°C.) | content of comonomer (mol %) |
|---|---|---|---|---|---|---|---|---|---|
| Example C3 | 0 | 133 | 13,300 | 1.0 | 0.31 | 0.924 | no flow | 119.5 | 2.0 |
|  | 0.5 | 185 | 18,500 | 1.4 | 0.34 | 0.928 | 0.21 | 122.0 | 2.0 |
|  | 4.5 | 171 | 17,100 | 1.3 | 0.34 | 0.938 | 49.0 | 124.5[*4] | 2.6 |

TABLE C2-continued

| Experiments | partial pressure of hydrogen (kg/cm²G) | yield of (co)polymer (g) | polymerization activity (g-polymer/g-solid catalyst) | specific*1 activity | B.D. (g/ml) | S.G.*2 (g/ml) | M.I. (g/10 min) | of Tm*3 (°C.) | content comonomer (mol %) |
|---|---|---|---|---|---|---|---|---|---|
| Reference Example C2 | 0 | 205 | 41,000 | 1.0 | 0.31 | — | no flow | & 122.0 133.0 | — |
| | 0.5 | 145 | 29,000 | 0.71 | 0.33 | — | 0.41 | 131.5 | — |
| | 4.5 | 103 | 20,500 | 0.50 | — | — | 11.0 | 133.0 | — |
| Comparative Example C2 | 4.5 | 51.5 | 5,150 | — | 0.31 | 0.936 | no flow | 127.0 | 1.5 |

Note:
*1 The specific activity under a partial pressure of hydrogen, while the polymerization activity in the absence of hydrogen is set at 1.
*2 True density (by means of a density gradient tube)
*3 DSC peak values
*4 Two DSC peaks at 124.5° C. and 122.0° C.

Figure 2:
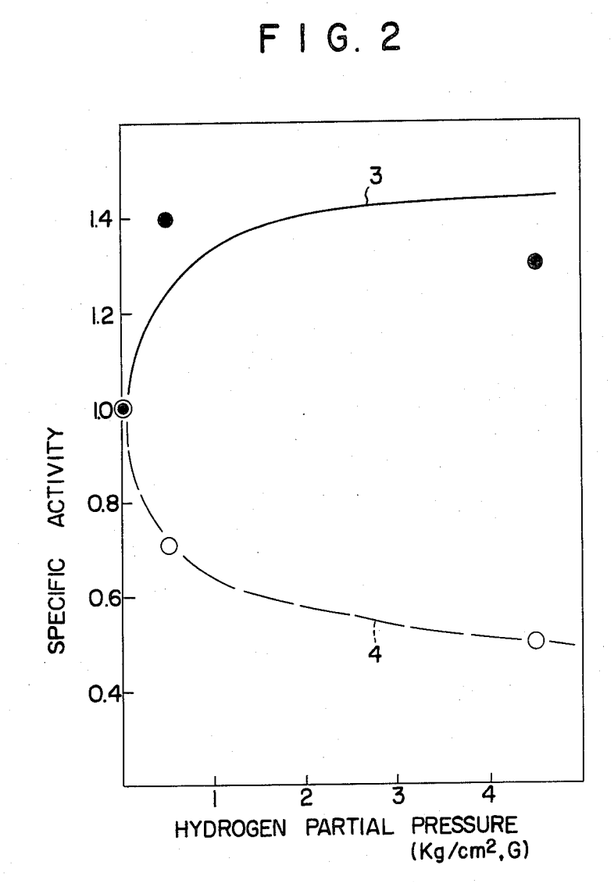
FIG. 2 is a graph indicating certain results of Example C3 (curve 3) and Reference Example C2 (curve 4).

FIG. 2 shows the relation between the partial pressure of hydrogen and specific activity with respect to Example C3 and Reference Example C2, which will be further explained below.

Comparative Example C2

Copolymerization of ethylene was carried out as in Example C3 except that 0.1 liter of ethylene norbornel was used instead of 0.1 liter of methyl-1,4-hexadienes. The results are shown in Table C2.

In this example, the activity is very low as compared with that in the case of methyl-1,4-hexadienes. Even at a hydrogen partial pressure of 4.5 kg/cm²G, the resulting molten copolymer showed no fluidity. The M.I. thereof could not be determined. Thus, it has been found that the molecular weight cannot be controlled by hydrogen.

(3) Graphs showing the influence of hydrogen

FIG. 1 shows the effects of hydrogen added on the specific activity in the copolymerization of propylene and methyl-1,4-hexadienes (Example C1) and homopolymerization of propylene (Reference Example C1), while the polymerization activity in the absence of hydrogen added in the polymerization system is set at 1.

From this figure, it is seen that, in the homopolymerization of propylene (curve 2), the activity is not enhanced even when the quantity of hydrogen is increased. On the contrary, in the copolymerization of propylene and methyl-1,4-hexadienes (curve 1), the activity is markedly enhanced as the quantity of hydrogen is increased.

FIG. 2 shows the effects of a hydrogen partial pressure on the specific activity in the copolymerization of ethylene and methyl-1,4-hexadienes (Example C3) and homopolymerization of ethylene (Reference Example C2), while the polymerization activity in the absence of hydrogen upon polymerization is set at 1.

From the figure, it is seen that, in the homopolymerization of ethylene (curve 4), the polymerization activity is markedly lowered as the hydrogen partial pressure is increased. On the contrary, in the copolymerization of ethylene and methyl-1,4-hexadienes (curve 3), it is seen that the polymerization activity is markedly enhanced.

EXAMPLE D1

Preparation of supported catalyst 20 g of magnesium chloride and 14 g of ethoxytrichlorotitanium were milled together for 24 hours in a vibration mill. 3 g of the powder thus obtained was slurried in 70 ml of 1,2-dichloroethane. 0.1 g of iodine trichloride were added to this slurry, which was then agitated at 80° C. for 2 hours. A solid product thus formed was separated from the liquid phase and amply washed with hexane, whereupon a supported catalyst was obtained.

This supported catalyst contained 9.1 percent by weight of titanium.

Alumina treatment

Methyl-1,4-hexadienes of a purity of 99.5 percent were deaerated by argon bubbling. The methyl-1,4-hexadienes thus deaerated were then passed through a column of 30-mm diameter filled to length of 1,000 mm with activated alumina (300-mesh) for chromatography in a stream of argon gas at a linear speed of the methyl-1,4-hexadienes within the alumina-filled column of 1.0 cm/min. Thereafter. the methyl-1,4-hexadienes were passed through a column of 30-mm diameter filled to a length of 1,000 mm with a molecular sieve (5A) in a stream of argon gas, whereupon purified methyl-1,4-hexadienes were obtained.

Copolymerization of ethylene and methyl-1,4-hexadienes

Polymerization 0.4 liter of well dried n-heptane and 0.1 liter of the above described purified methyl-1,4-hexadienes were placed in a 1-liter autoclave, and 200 mg of triethylaluminum and 10 mg of the above described supported catalyst were added thereto. The system was then caused to undergo copolymerization at 85° C. for 1.5 hours as a hydrogen partial pressure of 0.5 kg/cm² and an ethylene partial pressure of 4.5 kg/cm² were maintained. The results were as follows:

Copolymer yield (g): 185
Methyl-1,4-hexadienes content in copolymer (mol %): 2.0

Example D2

Preparation of supported titanium component 100 g of magnesium oxychloride was rendered into a slurry in 1.5 liters of n-hexane, and 205 ml of ethylaluminum dichloride was added to the slurry, which was then heated and caused to react for 6 hours. A solid product thus produced was separated, and to this 150 ml of hexamethyldisiloxane was added. The resulting mixture was heated and caused to undergo refluxing for 4 hours, whereupon a solid carrier was obtained.

20 g of this solid carrier, 9 ml of ethyl benzoate, and 3 g of trimethylsiloxyaluminum dichloride were milled together for 12 hours in a vibration mill. 8 g of the powder thus obtained was rendered into a slurry in 40 ml of 1,2-dichloroethane, to which slurry 40 ml of titanium tetrachloride was added. The resulting materials were caused to react at 80° C. for 2 hours. A solid product thus formed was amply washed with hexane, whereupon a supported titanium component was obtained.

The titanium content of this supported titanium component was 2.3 percent by weight.

Production of unsaturated copolymer

A 1-liter autoclave was charged with 0.25 liter of n-heptane, 300 mg of triethylaluminum, ethyl p-toluylate in a quantity corresponding to 0.26 mol with respect to 1 mol of the triethylaluminum, and 61 mg of the above described titanium component with carrier, in the order stated. Preparatory polymerization was then carried out for 15 minutes at 17° to 20° C. as the total pressure was maintained at 1 kg/cm² by introducing propylene under pressure. Thereafter, 0.25 liter of methyl-1,4-hexadiene was introduced under pressure into the reaction system, and hydrogen was added in a quantity corresponding to 100 ml under standard conditions. The temperature of the system was raised to 60° C., and polymerization was carried out for 1.5 hours under a total pressure maintained at 7 kg/cm² by further introducing propylene under pressure.

The properties of the polymer thus produced are set forth in Tables D1 and D2.

TABLE D1

| Properties of polymer obtained in Example D2 | |
|---|---|
| Concentration of methyl-1,4-hexadienes charged (% by volume): | 50 |
| Bulk density (g/ml): | 0.34 |
| Methyl-1,4-hexadiene content (mol %): | 4.0 |
| Residue of extraction with boiling heptane (%): | 92.4 |
| Tm, DSC peak value (°C.): | 152 |

TABLE D2

| Mechanical properties of polymer obtained in Example D2 | |
|---|---|
| Yield point stress (kg/cm²): | 275 |
| Breaking point stress (kg/cm²): | 460 |
| Elongation at breaking point (%): | 750 |
| Tensile modulus of elasticity (kg/cm²): | 4,680 |
| Flexural rigidity (kg/cm²): | 9,100 |

Example E1

Production of random copolymer of 4-methyl-1-pentene and methyl-1,4-hexadienes Into a 1-liter autoclave, 450 ml of 4-methyl-1-pentene, 50 ml of methyl-1,4-hexadienes, 0.5 g of the titanium trichloride composition of Example A1, and 2.5 g of diethylaluminum chloride were placed. Then after 100 ml (as converted to room temperature and atmospheric pressure) of hydrogen gas was added, these materials were caused to react at 55° C. for 6 hours.

As a result, 161 g of a copolymer of 4-methyl-1-pentene and methyl-1,4-hexadienes of a methyl-1,4-hexadienes content of 7.2 mol percent and a melting point (DSC peak value) of 219° C. was obtained. The tensile modulus of elasticity of this copolymer was 11,000 kg f/cm².

What is claimed is:

1. A thermoplastic, substantially resinous, unsaturated copolymer which is a random copolymer of an α-olefin selected from one member of the group consisting of ethylene, propylene, and 4-methyl-1-pentene with a branched 1,4-diene of the formula wherein $R^1$ is an alkyl group of at the most 8 carbon atoms, and each of $R^2$ and $R^3$ is hydrogen or an alkyl group of at the most 8 carbon atoms, the case where $R^2$ and $R^3$ are both hydrogen being excluded, said copolymer having a content of said branched 1,4-diene of 0.01 to 20 mol percent, an initial modulus of elasticity of 500 to 100,000 kg.f./cm.² and a melt index of at the most 500 grams/10 minutes.

2. A thermoplastic, substantially resinous, unsaturated copolymer according to claim 1 in which the α-olefin is propylene.

3. A thermoplastic, substantially resinous, unsaturated copolymer according to claim 1 in which the α-olefin is ethylene.

4. A thermoplastic, substantially resinous, unsaturated copolymer according to claim 1 in which the α-olefin is 4-methyl-1-pentene.

5. A thermoplastic, substantially resinous, unsaturated copolymer according to claim 1, 2, 3, or 4 in which the branched 1,4-diene is a member selected from the group consisting of 4-methyl-1,4-hexadiene, 5-methyl-1,4-hexadiene, and mixtures thereof.

6. A process for producing a thermoplastic, substantially resinous, unsaturated copolymer which is a random copolymer of an α-olefin selected from one member of the group consisting of ethylene, propylene, and 4-methyl-1-pentene with a branched 1,4-diene, said process comprising causing a mixture consisting essentially of said α-olefin and said branched 1,4-diene to contact a Ziegler-Natta catalyst whose transition metal component is a solid halogen-containing titanium compound or a solid composition thereof in the presence of hydrogen in a quantity such that the ratio of the partial pressure of hydrogen to the partial pressure of said α-olefin is a minimum of 0.01, said branched 1,4-diene having the formula wherein $R^1$ is an alkyl group of at the most 8 carbon atoms, and each of $R^2$ and $R^3$ is hydrogen or an alkyl group of at the most 8 carbon atoms, the case where $R^2$ and $R^3$ are both hydrogen being excluded, said copolymer having a content of said branched 1,4-diene of 0.01 to 30 mol percent and a melt index of at the most 500 grams/10 minutes, thereby producing a thermoplastic, substantially resinous, unsaturated copolymer having an initial modulus of elasticity of 500 to 100,000 kg. f./cm.².

7. A process for producing a thermoplastic, substantially resinous, unsaturated copolymer according to claim 6 in which said branched 1,4-diene is a member selected from the group consisting of 4-methyl-1,4-hexadiene, 5-methyl-1,4-hexadiene, and mixtures thereof.

8. A process according to claim 6 in which said branched 1,4-diene is treated with alumina beforehand prior to polymerization.

9. A thermoplastic, substantially resinous, unsaturated copolymer which is a substantially random copolymer of propylene and a branched 1,4-diene of the formula wherein $R^1$ is an alkyl group of at the most 8 carbon atoms, and each of $R^2$ and $R^3$ is hydrogen or an alkyl group of at the most 8 carbon atoms, the case where $R^2$ and $R^3$ are both hydrogen being excluded, wherein prior to copolymerization, propylene is caused to undergo homopolymerization in a quantity of about 0.25 to 3 percent by weight of the total polymer and said copolymer has a content of said branched 1,4-diene of about 0.01 to 20 mol. percent, an initial modulus of elasticity of 500 to 100,000 kg./f./cm.$^2$ and a melt index of at the most 500 grams/10 minutes.

10. The unsaturated copolymer according to claim 1 which has a melt index of from about 0.001 to 200 g./10 min. and an initial modulus of elasticity of about 1,000 to 80,000 kg.f./cm.$^2$.

11. The unsaturated copolymer according to claim 1, which has a melt index of from about 0.01 to 100 g./10 min. and an initial modulus of elasticity of about 2,500 to 50,000 kg.f./cm.$^2$.

12. The unsaturated copolymer according to claim 1, in which the content of said branched 1,4-diene is about 0.05 to 15 mol percent.

13. The unsaturated copolymer according to claim 1, in which the content of said branched 1,4-diene is about 0.1 to 10 mol percent.

14. The unsaturated copolymer according to claim 1 which has been prepared by copolymerization of said α-olefin and said branched 1,4-diene by contact with Ziegler-Natta catalyst having a transition metal component comprising a solid halogen-containing titanium compound or a solid composition thereof.

* * * * *